Patented Mar. 24, 1925.

1,530,714

UNITED STATES PATENT OFFICE.

DONALD M. CRIST, OF SANTA CRUZ, CALIFORNIA.

CHEMICAL REAGENT.

No Drawing.    Application filed February 21, 1921. Serial No. 446,897.

*To all whom it may concern:*

Be it known that I, DONALD M. CRIST, a citizen of the United States, and a resident of Santa Cruz, county of Santa Cruz, and State of California, have invented a certain new and useful Chemical Reagent, of which the following is a specification.

The invention relates to chemical reagents and particularly to acid reagent.

An object of the invention is to produce an acid reagent having very high oxidizing properties.

The invention possesses other advantageous features, some of which, with the foregoing, will be set forth at length in the following description where I shall outline in full, the process of producing the reagent.

In accordance with my invention, I mix ozone with sulphuric acid, preferably by introducing the ozone in gaseous form into the bottom of a container in which the sulphuric acid is contained. The acid which I have used is ordinary commercial sulphuric acid. The acid and the ozone have been mixed at ordinary temperatures. The chemical reaction if any which obtains has not been determined.

I have obtained a product having oxidizing properties in excess of those possessed by nitric acid by passing the ozone generated by a one kilowatt ozone generator into a tank containing three tons of sulphuric acid for a period of two hours. The resultant product is the reagent of my invention.

I claim:

1. The method of making a chemical reagent which comprises introducing ozone into sulphuric acid.

2. The method of making a chemical reagent which comprises introducing ozone in gaseous form and at ordinary temperature into sulphuric acid at normal temperature.

3. A new article of manufacture, comprising an acid formed by introducing ozone into sulphuric acid.

4. A new article of manufacture, comprising an acid formed by introducing ozone in gaseous form and at ordinary temperatures into sulphuric acid at normal temperature.

5. A new article of manufacture having very high oxidizing properties resulting from the mixture of ozone and sulphuric acid.

In testimony whereof, I have hereunto set my hand.

DONALD M. CRIST.